United States Patent
Takehara (10) Patent No.: US 8,526,282 B1
(45) Date of Patent: Sep. 3, 2013

(54) METHOD FOR REPLICATING MEDIA USING UNIQUE IDENTIFIERS

(75) Inventor: Shintaro Takehara, Clarks Summit, PA (US)

(73) Assignee: Cinram Group, Inc., Phoenix, AZ (US)

( * ) Notice: Subject to any disclaimer, the term of this patent is extended or adjusted under 35 U.S.C. 154(b) by 129 days.

(21) Appl. No.: 13/100,653

(22) Filed: May 4, 2011

Related U.S. Application Data (60) Provisional application No. 61/362,215, filed on Jul. 7, 2010.

(51) Int. Cl.
G11B 20/18 (2006.01)

(52) U.S. Cl.
USPC .......................................... 369/53.21

(58) Field of Classification Search
USPC ............ 369/53.21, 53.2, 53.41, 53.22, 47.12, 369/47.13, 83, 84; 707/999.107, 999.01, 707/999.101
See application file for complete search history.

(56) References Cited

U.S. PATENT DOCUMENTS

| | | |
|---|---|---|
| 4,647,947 A | 3/1987 | Takeoka et al. |
| 4,995,799 A | 2/1991 | Hayashi et al. |
| 5,181,081 A | 1/1993 | Suhan |
| 5,315,107 A | 5/1994 | Smith et al. |
| 5,371,792 A | 12/1994 | Asai et al. |
| 5,617,408 A | 4/1997 | Nishizawa et al. |
| 5,706,047 A | 1/1998 | Lentz et al. |
| 5,766,359 A | 6/1998 | Sichmann et al. |
| 5,766,495 A | 6/1998 | Parette |
| 5,792,538 A | 8/1998 | Yurescko-Suhan |
| 5,800,687 A | 9/1998 | Kempf |
| 5,863,328 A | 1/1999 | Sichmann et al. |
| 5,900,098 A | 5/1999 | Mueller et al. |
| 5,913,653 A | 6/1999 | Kempf |
| 5,932,042 A | 8/1999 | Gensel et al. |
| 5,932,051 A | 8/1999 | Mueller et al. |
| 5,932,058 A | 8/1999 | Mueller |
| 5,935,673 A | 8/1999 | Mueller |
| 5,949,752 A | 9/1999 | Glynn et al. |
| 5,958,651 A | 9/1999 | Van Hoof et al. |
| 5,995,481 A | 11/1999 | Mecca |
| 5,997,976 A | 12/1999 | Mueller et al. |
| 6,028,620 A | 2/2000 | Yin |
| 6,052,465 A | 4/2000 | Gotoh et al. |
| 6,081,785 A | 6/2000 | Oshima et al. |

(Continued)

FOREIGN PATENT DOCUMENTS

| | | |
|---|---|---|
| EP | 0802527 A1 | 10/1997 |
| WO | WO98/58368 | 12/1998 |

OTHER PUBLICATIONS

U.S. Appl. No. 11/726,968, filed Mar. 22, 2007 of Lewis Gensel et al.

(Continued)

*Primary Examiner* — Tan X Dinh
(74) *Attorney, Agent, or Firm* — Cooper & Dunham LLP (57) ABSTRACT

Methods and apparatuses are provided to manage the replication of contest recording media by assigning unique identifiers for content and media, and manage a database of records corresponding to the unique identifiers which include information related to the use of the unique identifiers. In addition, methods and apparatuses are provided for responding to content copy authorization requests, and are synergistically integrated with media replication management methods and apparatuses by using the same database of records corresponding to unique identifiers as a basis for such responses.

18 Claims, 7 Drawing Sheets

(56) References Cited

U.S. PATENT DOCUMENTS

| | | | |
|---|---|---|---|
| 6,117,284 | A | 9/2000 | Mueller |
| 6,124,011 | A | 9/2000 | Kern |
| 6,160,787 | A | 12/2000 | Marquardt, Jr. et al. |
| 6,261,403 | B1 | 7/2001 | Gerigk et al. |
| 6,285,762 | B1 | 9/2001 | Gotoh et al. |
| 6,309,496 | B1 | 10/2001 | Van Hoof |
| 6,309,727 | B1 | 10/2001 | Mueller et al. |
| 6,361,845 | B1 | 3/2002 | Kern |
| 6,405,203 | B1 * | 6/2002 | Collart .......... 382/205 |
| 6,414,920 | B1 | 7/2002 | Lee |
| 6,453,420 | B1 | 9/2002 | Collart |
| 6,527,538 | B1 | 3/2003 | Pickutoski et al. |
| 6,546,193 | B1 | 4/2003 | Um et al. |
| 6,608,804 | B2 | 8/2003 | Shim |
| 6,641,886 | B1 | 11/2003 | Bakos et al. |
| 6,665,489 | B2 * | 12/2003 | Collart .......... 386/253 |
| 6,708,299 | B1 | 3/2004 | Xie |
| 6,726,973 | B2 | 4/2004 | Mueller |
| 6,728,181 | B2 | 4/2004 | Shimoda et al. |
| 6,814,825 | B2 | 11/2004 | Becker |
| 6,885,629 | B2 | 4/2005 | Oshima et al. |
| 6,891,788 | B2 | 5/2005 | Yumiba et al. |
| 6,894,962 | B1 | 5/2005 | Nishiuchi et al. |
| 6,896,829 | B2 | 5/2005 | Kern et al. |
| 7,218,589 | B2 * | 5/2007 | Wisnudel et al. .......... 369/53.21 |
| 7,325,287 | B2 | 2/2008 | Sweeney |
| 7,419,045 | B2 | 9/2008 | Kelsch |
| 7,535,806 | B2 | 5/2009 | Fumanti |
| 7,564,771 | B2 | 7/2009 | Sweeney |
| 7,578,389 | B1 | 8/2009 | Haas |
| 7,590,039 | B2 * | 9/2009 | Carson .......... 369/53.2 |
| 7,637,713 | B1 | 12/2009 | Parette |
| 7,684,309 | B2 | 3/2010 | Mueller |
| 7,906,194 | B2 | 3/2011 | Pickutoski et al. |
| 7,910,191 | B1 | 3/2011 | Mueller et al. |
| 8,302,201 | B1 * | 10/2012 | Gupta et al. .......... 726/26 |
| 2001/0033517 | A1 | 10/2001 | Ando et al. |
| 2003/0031109 | A1 | 2/2003 | Lee et al. |
| 2004/0071060 | A1 | 4/2004 | Suh et al. |
| 2004/0073491 | A1 | 4/2004 | Suh |
| 2004/0076101 | A1 | 4/2004 | Suh et al. |
| 2004/0228245 | A1 | 11/2004 | Lee |
| 2005/0114350 | A1 * | 5/2005 | Rose et al. .......... 707/10 |
| 2005/0154905 | A1 | 7/2005 | Kojima et al. |
| 2006/0023598 | A1 | 2/2006 | Babinski et al. |
| 2006/0104190 | A1 | 5/2006 | Babinski |
| 2006/0114803 | A1 | 6/2006 | Ootera et al. |
| 2006/0114807 | A1 | 6/2006 | Ootera et al. |
| 2006/0165419 | A1 | 7/2006 | Musto |
| 2006/0181706 | A1 | 8/2006 | Sweeney |
| 2006/0270080 | A1 | 11/2006 | Rinaldi |
| 2006/0274617 | A1 | 12/2006 | Musto et al. |
| 2007/0090006 | A1 | 4/2007 | Kelsch |
| 2008/0223743 | A1 | 9/2008 | Lenkeit |
| 2009/0127142 | A1 | 5/2009 | Rothstein et al. |
| 2009/0245055 | A1 * | 10/2009 | Hamersley et al. .......... 369/53.21 |
| 2010/0014408 | A1 | 1/2010 | Musto et al. |
| 2010/0074094 | A1 | 3/2010 | Sakamoto et al. |
| 2010/0129586 | A1 | 5/2010 | Mueller |
| 2011/0019527 | A1 | 1/2011 | Mueller et al. |
| 2012/0057707 | A1 * | 3/2012 | Fang .......... 380/277 |

OTHER PUBLICATIONS

U.S. Appl. No. 11/936,625, filed Nov. 7, 2007 of Petrus Hubertus Van Hoof et al.
U.S. Appl. No. 12/965,270, filed Dec. 10, 2010 of William R. Mueller et al.
U.S. Appl. No. 13/028,709, filed Feb. 16, 2011 of Jeff Williams.
U.S. Appl. No. 13/053,439, filed Mar. 22, 2011 of Lewis Robert Gensel, Jr. et al.
"Advanced Access Content System: Introduction and Common Cryptographic Elements Book," (2009) AACS LA LLC.
"Advanced Access Content System: Pre-recorded Video Book," (2009) AACS LA LLC.
"Advanced Access Content System: Blu-ray Disc Pre-recorded Book," (2009) AACS LA LLC.

* cited by examiner

METHOD FOR REPLICATING MEDIA USING UNIQUE IDENTIFIERS

CROSS-REFERENCE TO RELATED APPLICATION

This application claims the benefit of U.S. Provisional Application No. 61/362,215, filed on Jul. 7, 2010.

TECHNICAL FIELD

This disclosure relates to an approach for managing the replication of content recording media. In particular, unique identifiers are distributed to media replicators for recording to media. Records for the unique identifiers are maintained in a database and may include information regarding their replication status as well as information relating to content copying rights.

DESCRIPTION OF RELATED ART

Content recording media have become popular for distributing audiovisual content from content replicators, such as movie studios, music recording studios, television studios, etc. to content consumers, such as end users, movie or music rental companies, etc. Content recording media are also used to distribute or archive content such as text documents, spreadsheets, databases, etc. Examples of popular content recording media include optical storage media, solid state memory devices and may also include virtual media such as virtual media downloadable from a content source.

With regard to optical storage media, the use of CDs (compact discs), DVDs (digital versatile discs or digital video discs) and BDs (Blu-Ray discs) for storing and transporting content (such as audio, video, graphics, computer software, etc.) in an optically readable manner has been popular for a number of years.

Several formats of optical storage media are currently available, including (A) read-only formats such as CD-DA (digital audio compact disc), CD-ROM (CD-read-only memory), DVD-ROM and other formats wherein content is prerecorded on the disc (such as by using an injection molding process), and (B) recordable formats in the form of (i) write-once read-many times formats such as CD-R (CD-recordable), and DVD±R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs. Optical disc players for these optical discs use a red laser (with a wavelength range of 635 nm to 660 nm in the case of DVD and a wavelength of approximately 780 nm in the case of CD).

Optical storage discs using a blue laser (with a wavelength range of 400 nm to 420 nm), such as BDs, (which includes read-only, recordable and rewritable formats) are also popular. The popularity of optical storage media driven by advancements in computer, information communication and multimedia technologies has been accompanied also by demands for a higher density and a greater capacity of optical storage media. BD format media provide high density storage which attempts to meet such demands.

In addition, optical media having plural information layers readable from the same side (for example DVD-9) or readable from both sides (for example, DVD-10 and DVD-18), as well as hybrid optical media which include a combination of formats, are also available.

In conventional read-only type optical discs (for example, CD-ROM, DVD-ROM, etc.), data is generally stored as a series of "pits" embossed in a plane of "lands".

Microscopic pits formed in a surface of a plastic medium [for example, polycarbonate or polymethyl methacrylate (PMMA)] are arranged in tracks, conventionally spaced radially from the center hub in a spiral track originating at the medium center hub and ending toward the medium's outer rim. The light reflected from a read-only medium's surface in an optical disc player or reader varies according to the presence or absence of pits along the information track. A photodetector and other electronics inside the optical disc player translate the signal from the transition points between these pits and lands caused by this variation into the 0s and 1s of the digital code representing the stored information.

Read-only type optical discs generally are produced by an injection molding process. Initially, data representing the content to be recorded, encoded as a run length limited digital code (commonly known as an EFM signal in CD manufacturing) which contains its digital information in the timing between transitions, is used to control a laser beam recorder to form pits in a photoresist or a dye-polymer layer on an optical grade glass disc known as a glass master. A metallized glass master is used in an electroforming process to form (typically, metal) stampers which are in turn used in injection molding of a plural of optical recording discs.

In the molding process, a stamper is used on one side of an injection molding cavity to emboss an information layer of pits and lands on a transparent polymer substrate formed by injection molding. The information bearing surface of the substrate is then covered with a reflective film (of metal or alloy) or the like. In the case of a CD, a plastic protective coating is applied over the film, and then art (for example, a picture, a design, text, etc.) is typically printed on the upper surface of the disc, to form an end product. In the case of DVDs, two half-thickness substrates are typically formed, metallization is applied to one (for example, DVD-5) or both (for example, DVD-10, DVD-9, DVD-18) half-thickness substrates, and the two half-thickness substrates are bonded by an adhesive (for example, hotmelt adhesive, ultraviolet light-cured adhesive, etc.). A second information layer can be formed for a DVD (for example, DVD-18) by applying a photo-polymer coating over a metallization layer applied to a substrate and the second information layer is embossed by a stamper into the photo-polymer layer which is then UV cured, metallized and protective coated.

Recordable type optical media typically include a spiral wobble groove in the substrate. The groove defines recording channels on the disc for recording data, provides information for tracking of the disc while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include a recording layer, and in addition a reflective layer (of metal or alloy) and a protective layer, and may include other layers. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to irreversibly form a pattern of marks or pits into the recording layer.

Each recording side of a rewritable disc also uses multiple layers beginning with a polycarbonate plastic substrate containing a shallow spiral groove extending from the inside to the outside diameter of the disc. A DVD-RW disc may additionally include pits and lands and a DVD-RAM disc also inside or alongside the groove itself. The substrates (including information layer bearing the spiral groove, land pre-pits and embossed areas) may be formed by injection molding, using a stamper electroformed with a glass master. Next in the multiple layers of a rewritable disc typically comes a dielectric layer, followed by a phase-change type recording layer having a polycrystalline structure, another dielectric layer and a reflective layer (of metal or alloy). Additional layers may also be incorporated above or below the dielectric layer, with a protective coating being applied as a last layer, and art may be applied to at least one surface. During recording of the rewritable optical medium, the laser selectively heats and allows cooling of tiny areas of the recording track to change the phase of each heated area from more crystalline into less crystalline (also known as "amorphous") phase, in order to create marks that can be called "pits". During erase, the laser (in a process called "annealing") changes the amorphous areas back into more crystalline areas.

BD format discs, like other disc formats, may be manufactured according to a variety of manufacturing processes. For example, in one example, BD format discs may be manufactured by injection molding a nominal 1.1 mm substrate with pits and sputtering a reflective layer over the pits to form an information layer, and applying a nominal 0.10 mm transparent cover layer over the information layer.

In another example, BD format discs may be manufactured by adhering two or more half-discs together to form a 1.1 mm substrate over which a cover layer is formed. The half-discs may be blank or may each include information layers compliant with the BD or other disc formats.

In another example, an information layer may be added to a substrate in a so-called wet embossing process in which a liquid resin deposited on a substrate is brought into contact with a stamper to emboss an information surface into the resin layer. The resin layer is then cured and the stamper is removed. A reflective layer is formed over the information surface to form the information layer. The substrate may be blank or may comprise one or more additional information layers.

Thus, according to these or other manufacturing processes, BD format discs may be provided with two or more information layers. The two or more information layers may be configured to be read from a same side, as in the example of a single sided dual layer BD disc or a single sided BD-DVD disc. Alternatively, the two or more information layers may be configured to be read from both sides of the disc, as in the example of a dual sided BD disc or a dual sided BD-DVD disc.

In addition, various types of other hybrid optical media are available. For example, one type of hybrid media has data pit patterns prerecorded on a surface of a substrate and has in addition a recording layer allowing a user to record data to the recording layer. Further, optical recording media having multiple recording layers are now also available. In addition, in another hybrid optical recording disc a read-only area and a recordable area are present on one side of the hybrid optical disc, with a wobble groove in the read-only area modulated by depressions in the substrate and extending into the substrate in the recordable area. Each of the hybrid optical media has one or more reflective films (of metal or alloy) or the like.

The high capacity of optical recording media, coupled with recent enhancements to personal computers and the advent of recordable optical media technology, renders optical media popular for illicit use. For example, unauthorized copying of proprietary and/or copyrighted, recorded content from optical media to optical media on a large scale (also referred to as "piracy") is a growing concern. The piracy typically entails using software on a computer system having an optical medium drive to copy content from a recorded optical medium onto recordable media such as CD-R or CD-RW (or DVD-R, DVD-RW or DVD+RW) discs.

Many copy protection techniques and devices have been proposed to limit copying of content on optical media. Several of the proposed copy protection techniques are discussed in commonly-owned U.S. application Ser. No. 10/903,099, filed Jul. 30, 2004 and entitled METHOD AND APPARATUS FOR PROTECTING AGAINST COPYING OF CONTENT RECORDED ON OPTICAL RECORDING MEDIA, the entire contents of which are incorporated by reference herein.

Some optical recording media have a burst cutting area (BCA) which is specified by the standards or specifications which govern those types of optical recording media.

For example, some format specifications include provisions for a burst cutting area that is intended for copy protection use.

For example, the DVD specification, which specifies the format of data on DVDs, provides for an optional Burst Cutting Area (BCA) inside of the lead-in area of a DVD, between an inner circumference of 22.3 mm+0/−0.4 mm and to an outer circumference of 23.5 mm+/−0.05 mm from the center of the center hole of a disk. The BD specification, as another example, provides for a BCA between the radii of 21.0 mm and 22.2 mm, generally. The BCA in a DVD or BD is typically used by forming one or more marks (such as a copy protection mark or code) or a bar code utilizing a YAG laser, power laser (Annex K), high power laser diode, etc. by selectively removing portions of a reflective layer. Another technique for forming a BCA mark by recording a plurality of pits is discussed in commonly-owned U.S. provisional application No. 61/331,250 filed May 4, 2010 and entitled OPTICAL RECORDING MEDIUM AND BCA RECORDING METHOD AND APPARATUS, the entire contents of which are incorporated by reference herein.

Figure 1:
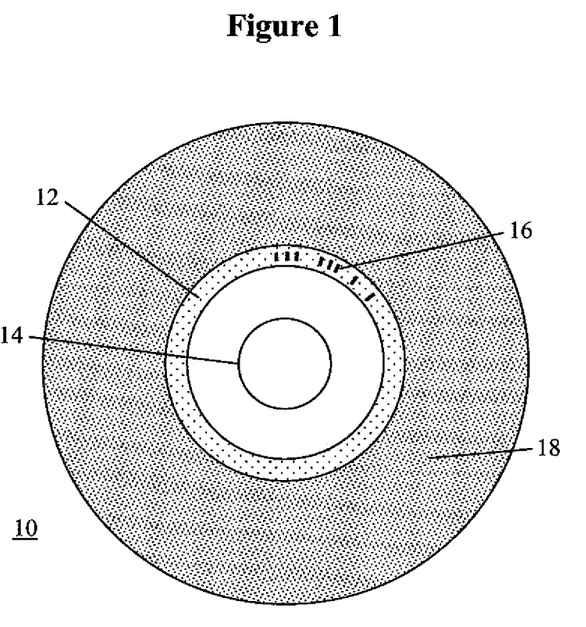
FIG. 1 shows a schematic representation of an exemplary optical storage disc.

A schematic representation of an optical storage disc 10 is illustrated in FIG. 1. The BCA 12 is shown in the form of a ring around the central spindle hole 14 of the disc 10 and a plurality of BCA marks 16 are recorded within the BCA 12. The data area 18 of the disc 10 is generally located in an area of the disc 10 further from the central spindle hole 14 than the BCA 12.

It has been proposed to use the BCA marks for tracking DVDs to aid copy prevention. The DVD specification does not preclude the possibility of repeating the same mark on multiple discs of the same title.

Content Protection for Recordable Media (CPRM) is an option found in some DVD recorders that write DVD-RW and DVD-RAM discs using the DVD Video Recording format (DVD-VR). Such an option allows material specifically flagged "copy once" to be written to a single disc but prevents that disc from then being further duplicated. This restriction is accomplished by binding the content to the particular disc through encryption employing a code or BCA data, amongst other information, for each writable disc compliant with the CPRM system. Such code is inserted into the Burst Cutting Area (or Narrow Burst Cutting Area or NBCA in the case of a DVD-RW) of the disc, to keep the disc from being further duplicated by a DVD recorder.

U.S. Pat. Nos. 6,608,804, 6,641,886, 6,885,629, 6,891,788 and 6,894,962 discuss assorted uses of a burst cutting area and types of information which can be written in the burst cutting area. Some conventional techniques for writing and processing of data in a burst cutting area are discussed in U.S. Pat. Nos. 6,052,465, 6,081,785, 6,414,920, 6,453,420, 6,546,193, 6,708,299, 6,728,181, and in International Publication No. WO98/58368. The entire contents of each of U.S. Pat. Nos. 6,052,465, 6,081,785, 6,414,920, 6,453,420, 6,546,193, 6,608,804, 6,641,886, 6,708,299, 6,728,181, 6,885,629, 6,891,788 and 6,894,962, and International Publication No. WO98/58368 are incorporated herein in order to more fully illustrate the state of the art as of the date of the subject matter described herein.

Examples of solid state content recording media include semiconductor memory chips comprised in USB flash drives, Compact Flash cards, SD cards, etc. Such media may be of the non-volatile or volatile type.

In addition, virtual content recording media may be employed to distribute content to consumers. Examples of virtual content recording media include computer data file collections, compressed and/or encrypted digital volumes and the like.

As mentioned above, there have been attempts to thwart unauthorized copying or theft of content from content recording media. Some of the approaches attempted have required the use of a medium identifier in a secure handshaking routine, copy authorization procedure, medium authentication algorithm, etc.

However, there remains a need for an integrated system for managing the distribution of media identifiers to content recording media replicators as well as managing copy requests from media players in communication with the media.

SUMMARY

This disclosure provides tools for managing replication of content recording media, as well as tools for securely responding to content copy authorization requests by managing the distribution and use of unique identifiers recorded to the content recording media.

In an aspect, a method for managing the replication of content recording media includes assigning, in response to a request for unique identifiers from a media replicator, at least a number of requested unique identifiers to the replicator, returning the unique identifiers to the replicator and recording a status of the unique identifiers as having been returned to the replicator, in database records of a database corresponding to each of the unique identifiers returned. In addition, a notice is preferably sent from the replicator indicating at least those unique identifiers returned to the replicator which were recorded to acceptable media, if any. The corresponding records in the database are updated in response to the notice.

In another aspect, a unique identifier manager comprises a data storage part configured to store a database including records corresponding to one or more unique identifiers, a network communication part configured to share information with a replicator and/or media player, and a control part for implementing various content recording media replication control methods and/or copy authorization request response methods.

In yet another aspect, a content recording media replicator comprises a unique identifier recording part, a content recording part, a network communication part configured to share information with a unique identifier manager, and a control part for implementing various content recording media replication control methods.

In still another aspect, a method for responding to a content authorization request includes receiving a content copy authorization request from a media player sent in response to user input and determining, based on a unique identifier of a medium in communication with the media player storing the content for which the copy authorization request is received, whether to grant the copy authorization request by evaluating a record corresponding to the unique identifier in a database. If granted, a copy authorization is sent to the media player and the record corresponding to the unique identifier is updated with the request authorization information.

In a further aspect, a media player comprises a media reader part, a network communication part configured to share information with a unique identifier manager, and a control part for implementing various copy authorization request response methods.

In a further aspect, a multipurpose media interface apparatus comprises a media reader part, a network communication part configured to share information with a unique identifier manager, either a media recording part or a media recorded provided in communication therewith, and a control part configured to implement various copy authorization request response methods.

In one example, a multipurpose media interface apparatus is configured to record a unique identifier included with a copy authorization from a unique identifier manager to a medium along with the content authorized to be copied.

BRIEF DESCRIPTION OF THE DRAWINGS

The above mentioned and other aspects, features and advantages can be more readily understood from the following detailed description with reference to the accompanying drawings wherein.

DETAILED DESCRIPTION

Methodologies and apparatuses for managing the replication and use of content recording media are described herein, with reference to examples and exemplary embodiments. Specific terminology is employed in describing examples and exemplary embodiments. However, the disclosure of this patent specification is not intended to be limited to the specific terminology so selected and it is to be understood that each specific element includes all technical equivalents that operate in a similar manner.

The term "content recording medium" as used in this application generally refers to any (one or more of) apparatus, device, composition, and the like, capable of retaining content for future use, copying, playback, and the like. Some examples of content recording media include solid state storage devices, printed media, virtual storage media and optical storage media formats such as CDs, DVDs and BDs, etc.

The terms "title", "content" and "digital content" are generally used in this disclosure to refer to any data storable and reproducible from a content recording medium. Examples of such data include videos, audio files, text documents, spreadsheets, databases, etc. Content may additionally be encrypted or protected.

The term "media player" as used in this application generally refers to an electronic appliance or software tangibly embodied on or in a computer-readable medium which can be executed on a computer configured to reproduce content from a content recording medium. A media player is also sometimes referred to as a "reader" or "player".

The terms "play" and "reproduce" are generally used in this disclosure to refer to an operation in which content is read from a content recording medium and output to one or more displays.

The term "display" is generally used in this disclosure to refer to any displaying or reproducing apparatus configured to convert digital content into visual, aural, or other humanly detectable and comprehensible stimuli. Examples of such an apparatus include monitors, televisions, displays, speakers, AN receivers, mobile electronic devices, computers, etc.

The terms "network" and "information network" are generally used in this disclosure to refer to, for example, any means by which an electronic signal may be communicated from one location to another. Examples of information networks include the internet, LAN (Local Area Networks), WAN (Wide Area Networks), Wireless Networks (such as Bluetooth, WLAN (Wireless LAN), IR (Infrared), RF (Radio Frequency), CDMA (Code Division Multiple Access), GSM (Global System for Mobile communications), WiMAX (Worldwide Interoperability for Microwave Access), PCS (Personal Communications Service), etc.). Communication through a network between devices may be accomplished using protocols well understood to those skilled in the relevant arts.

The term "unique identifier" is generally used through this disclosure to refer to any set of data, number, graphic marking, geometric, shape or pattern, etc. which can be configured to be different, as recognized by a media player from one unique identifier to the next. Examples of unique identifiers include serial numbers, bar codes, etc. As a further example, a unique identifier such as a serial number may be provided in a BCA of an optical storage medium or on a printed medium such as a sheet of paper.

Figure 2:
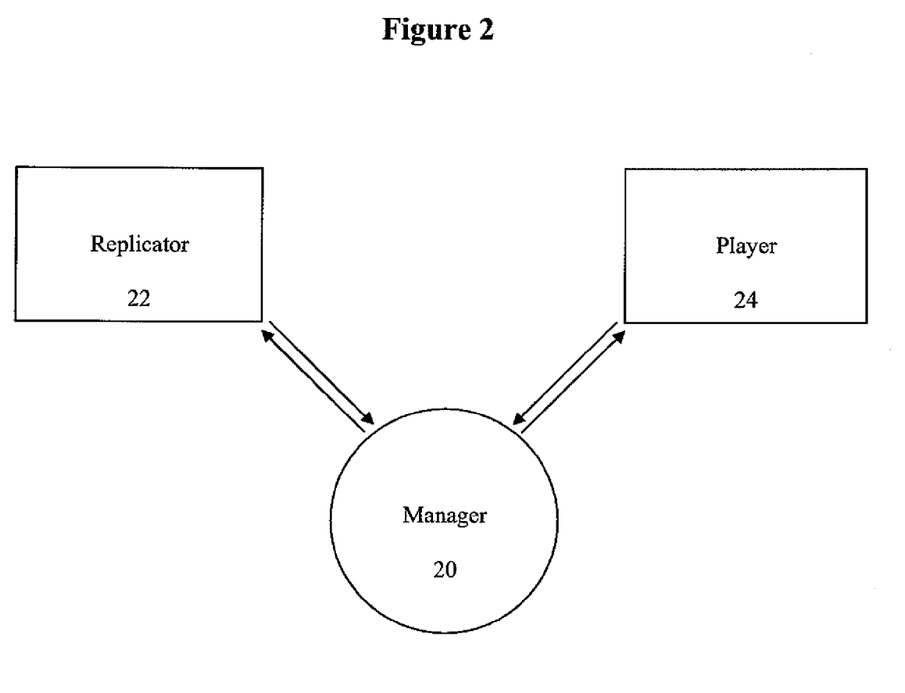
FIG. 2 shows a schematic representation of an example of a system for managing the replication of media and for managing the copying of content according to an exemplary embodiment of the present disclosure.

In an aspect of the present disclosure, illustrated generally in FIG. 2, a manager 20 is provided in communication with a content recording media replicator 22. The same manager may also be provided in communication with one or more media players 24. The manager 20 is configured to manage the replication of content recording media by the replicator 22 and/or respond to copy authorization requests from one or more players 24.

Figure 3:
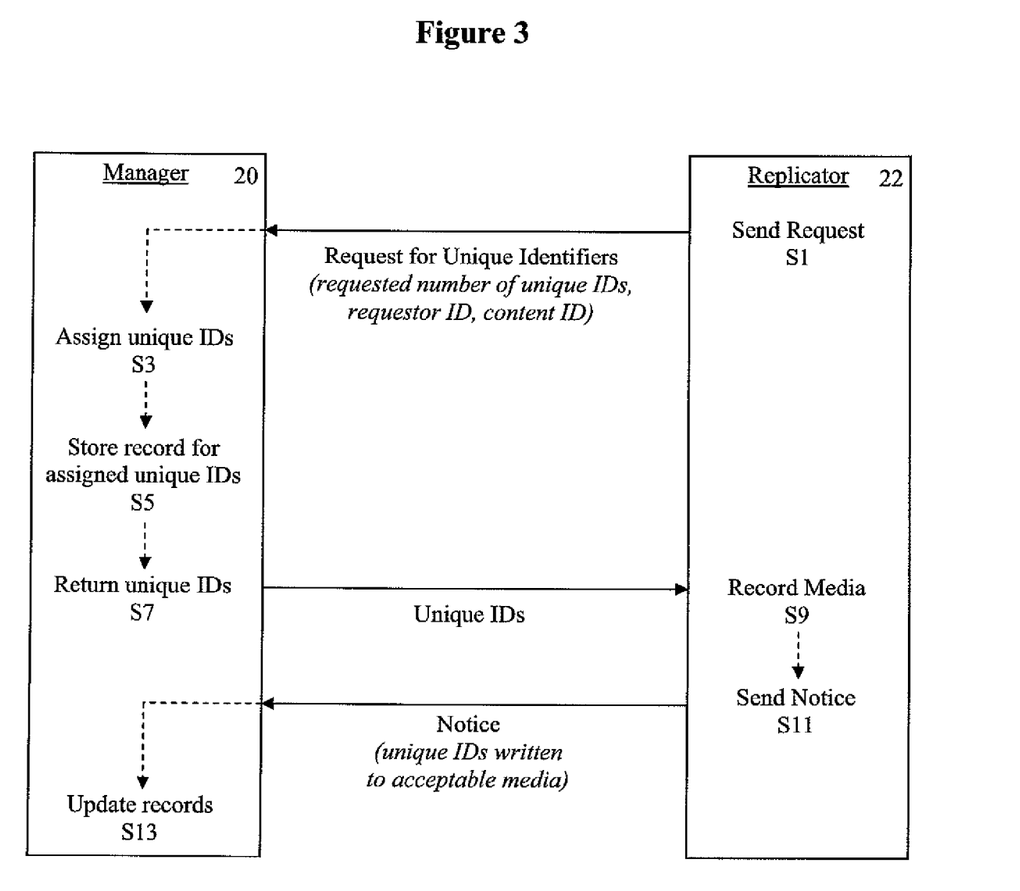
FIG. 3 graphically illustrates an example of a management approach between a manager and a replicator according to an exemplary embodiment of the present disclosure.

An example of a methodology for managing the replication of content recording media according to the present disclosure is shown generally in FIG. 3. The methodology includes steps performed by a content recording media replicator 22 and a unique identifier manager 20.

Figure 4:
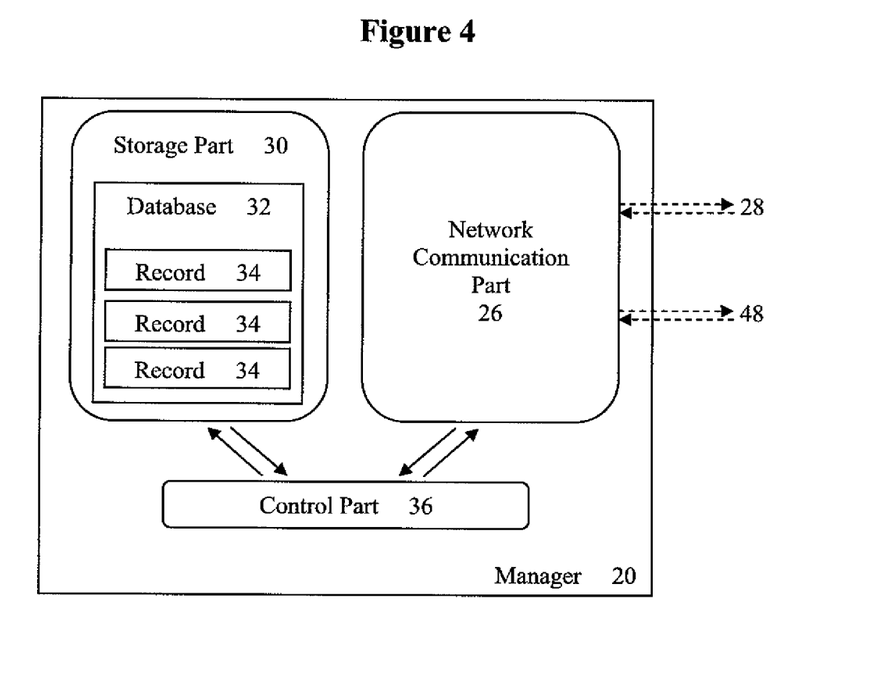
FIG. 4 notionally illustrates an example of a unique identifier manager according to an exemplary embodiment of the present disclosure.

An exemplary unique identifier manager 20 is shown generally in FIG. 4. The exemplary unique identifier manager includes a network communication part 26 for sharing information through a network 28 and/or 48 with a content recording replicator 22 and/or one or more media players 24, respectively. Networks 28 and 48 may be the same or may be different. The manager 20 also includes a data storage part 30 configured to store a database 32 of records 34 relating to one or more unique identifiers. Each unique identifier assigned and returned to a replicator 22, as explained below, has a corresponding record 34 in the database 32 stored in the data storage part 30. The unique identifier manager 20 also includes a control part 36 for implementing the various methodologies described herein. The control part 36 interfaces with, for example, the network communication part 26 and the data storage part 30.

Figure 5:
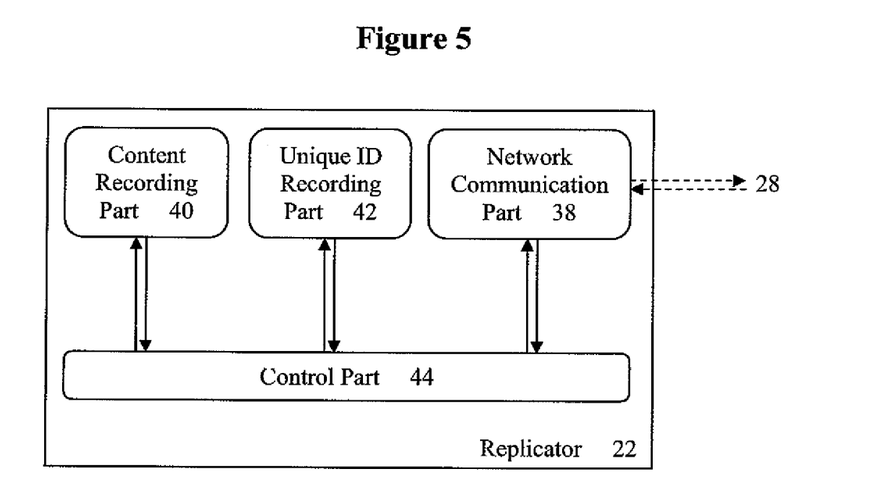
FIG. 5 notionally illustrates an example of a content recording media replicator according to an exemplary embodiment of the present disclosure.

An exemplary content recording media replicator 22 is shown generally in FIG. 5. It will be understood that a unique recording media replicator 22 may be a single apparatus or may be comprised of any number of interrelated apparatuses. The exemplary content recording media replicator 22 includes a network communication part 38 for sharing information with the unique identifier manager 20 through a network 28.

The replicator 22 also includes a content recording part 40 configured to record content to media and a unique identifier recording part 42 configured to record unique identifiers to media. The content recording part 40 and the unique identifier recording part 42 may be the same part or may be different parts. For example, in the case of optical storage media, a unique identifier may be recorded to a disc using a high powered laser which selectively removes portions of a reflective layer. In this example, the content may be recorded to the disc in an injection molding process whereby pits are formed in an information layer of the disc by a surface of a mold element.

The content recording media replicator 22 also includes a control part 44 for implementing the various methodologies described herein. The control part interfaces with, for example, the network communication part 38 and the recording parts 40 and 42. Also, one or more defect inspection parts may optionally be included in a content recording media replicator 22, as discussed in more detail below.

In an exemplary replication management method, such as the one shown generally in FIG. 3, a request is sent Si to a manager 20 by a replicator 22 for a requested number of unique identifiers. The request also includes an identification of the media replicator 22 making the request, such as a name, a replicator ID number, etc. In addition, the request for unique identifiers also includes an identification of the content for which the unique identifiers are requested. The content identification may take the form of, for example, a content identification number, a textural title, etc. The content identified in the request is that content which is intended to be recorded to the same media as the requested unique identifiers. In addition, the identification of the content and the identification of the replicator may be configured in the request as a combined content identifier. As another option, the request may include an identification of a type of medium to which the content and unique identifier are intended to be recorded.

The request is then received and processed by the unique identifier manager 20. The unique identifier manager 20 may, for example, comprise a server or other apparatus for performing the processing steps automatically or may be performed by a person, or a combination of a server with human oversight may be employed to manage the unique identifier distribution methodology described herein.

In processing the request, the manager 20 may be configured to determine, for example, if the replicator 22 identified in the request is allowed to receive unique identifiers, if the content identified in the request is authorized to be recorded with a unique identifier, and if the content identified in the request is authorized to be recorded by the replicator 22 identified in the request. Upon a determination that the request should be granted, the manager 20 assigns S3 at least the requested number of unique identifiers to the replicator 22. The manager 20 may be configured to return more than the requested number of unique identifiers to ensure that the replicator 22 has enough unique identifiers to record the desired number of acceptable media in case of recording errors, etc.

The unique identifier manager 20 stores and maintains a database 32 of records 34 relating to the unique identifiers. Each unique identifier has a corresponding record 34 in the database 32. The database 32 may be preconfigured with a record 34 for all possible unique identifiers or the manager 20 may generate the unique identifiers in response to a request for identifiers. The generation of the unique identifiers may be at random and/or may include a calculation or operation based on one or more of the data received in the request, such as the requestor identifier, the content identifier, the number of requested unique identifiers, a time and/or date of the request, etc. A unique identifier may be configured, particularly if it is generated in response to a request, to indicate any of the information received in the request without reference to the database 32 to a person or device configured to read and interpret the unique identifier.

In any event, any unique identifier assigned to a request S3 is provided S5 with a corresponding record 34 in the database 32. Each record 34 is configured to store status information about the unique identifiers. For example, when a unique identifier is returned S7 to a replicator 22 in response to a request, the corresponding record 34 in the database 32 is updated to include an indication that that particular identifier has been returned to a requestor. The record 34 may also be updated to include information relating to the request in response to which it was returned. For example the identification of the requestor 22, content for which the request was received, a time and/or date of the request, etc. may additionally be stored in the record 34.

Unique identifiers are configured to be distinct from one another at least insofar as they are returned in response to a request indicating a particular content. That is, for a particular content, the unique identifiers assigned and returned for recording to the content recording media along with the particular content are each distinct from one another. In this way, no two media having the same content will have the same unique identifier.

Optionally, all unique identifiers assigned and returned to replicators 22 can be different from one another. In this case, no two media will ever have the same unique identifier, regardless of the content recorded to the media.

In order to ensure the appropriate uniqueness of the unique identifiers, the manager 20 is configured not to assign or return unique identifiers to a replicator 22 which have a record 34 in the database 32 indicating that they have been returned to a replicator 22 or used by a replicator 22 in response to a previous request for unique identifiers for a medium or the same content as is identified in the present request, as appropriate.

When the unique identifiers are received by the replicator 22, the replicator 22 begins recording S9 the unique identifiers to content recording media. The replicator 22 may write the unique identifiers to media which already contain the content or which have yet to be recorded with the content.

After recording the content and unique identifiers to a media, whether the media are acceptable or not, the replicator 22 sends a notice S11 back to the manager 20 indicating at least which unique identifiers, if any, were recorded to acceptable content recording media.

As with any manufacturing process, some of the content recording media may be defective and may not be acceptable for distribution to consumers. Defects can arise in any stage of the manufacturing processes for various content recording media. For example, a defect or recording error may occur when recording the unique identifier to the medium, when recording the content to the medium and/or at some point before or after each of these recording processes.

Thus, it is preferable to include a defect inspection step in at least one portion of the manufacturing process so as to detect non-acceptable media before they are distributed to consumers. Accordingly, the replicator 22 may include one or more defect inspection parts. Many techniques are known in the art which may be used to detect defective media. As one example, for optical storage media, a laser or other light may be directed at an information layer of a medium and the light reflected from the information layer may be monitored by a photodetector to detect irregularities or unexpected reflectance variations in the information layer.

If a content recording medium is determined to be defective, the defective medium may be discarded, destroyed and/or recycled depending on the medium type and/or a secretiveness of the content, if any, recorded to the medium. With respect to a unique identifier recorded to a disc determined to be not acceptable for distribution, the unique identifier, for example, may be reused in another medium by the same replicator 22 for a medium having the same content as the defective disc, may be forgotten by the replicator 22 and not reused, or may be identified in the notice sent back S11 to the manager 20 as having been recorded to a defective medium.

In response to receiving the notice sent S11 from the replicator 22 to the manager 20, the manager 20 updates S13 the status in the record 34 corresponding to each unique identifier included in the notice. For example, for unique identifiers identified in the notice as having been recorded to an acceptable medium, the manager 20 updates the status of those identifiers in the corresponding records 34 of the database 32 to indicate such. In another example, if the notice received from the replicator 22 indicates any unique identifiers which were recorded to a defective or not acceptable medium, the status of those unique identifiers in the corresponding records 34 may be updated by the manager to indicate that the unique identifiers have not been used and are available for assignment in response to a new request for unique identifiers or the manager 20 may retire those unique identifiers by updating their status to indicate that they were recorded to a defective medium and not returning those unique identifiers in response to a future request.

In responding to future requests for unique identifiers, the manager 20 is configured not to assign or return unique identifiers having in their corresponding records 34 in the database a status indicating that they have been returned to a replicator 22 or which indicate that they have been used on an acceptable storage medium. In this way, the uniqueness of the unique identifiers may be assured.

In addition, the notice received from the replicator 22 may include an identification of the request for unique identifiers to which the notice pertains. The request identification may, for example, be any combination of the information sent in the initial request, a time and/or date of the request, a request identifier assigned by the manager 20, etc.

In another example, when a notice received from a replicator 22 does not include information regarding unique identifiers which were not recorded to an acceptable medium, the manager 20 may be configured to assume that the unique identifiers assigned and returned to a replicator 22 in response to a request and which were not included in a notice received from the replicator 22 pertaining to that request were either not used or were recorded to a defective or not acceptable medium. In this case, the status of the unique identifiers in the corresponding record 34 in the database 32 may be updated by the manager 20 to reflect such assumption. As described above, according to the configuration of the manager 20, the unique identifiers assumed to be unused or written to defective media may be recycled or retired.

In an alternative embodiment, the notice sent S11 from the replicator 22 to the manager 20 may indicate only those unique identifiers which were recorded to defective or not acceptable media or which were not used. In this example, the manager 20 may be configured to assume that any unique identifier returned to the replicator 22 and not indicated in the notice was successfully recorded to an acceptable medium. Such an example may advantageously reduce a data size of the notice.

In another aspect, the manager 20 configured to manage the distribution of unique identifiers to content recording media replicators 22 may also be configured to authorize a copy operation by a player 24 in communication with a content recording medium.

Figure 6:
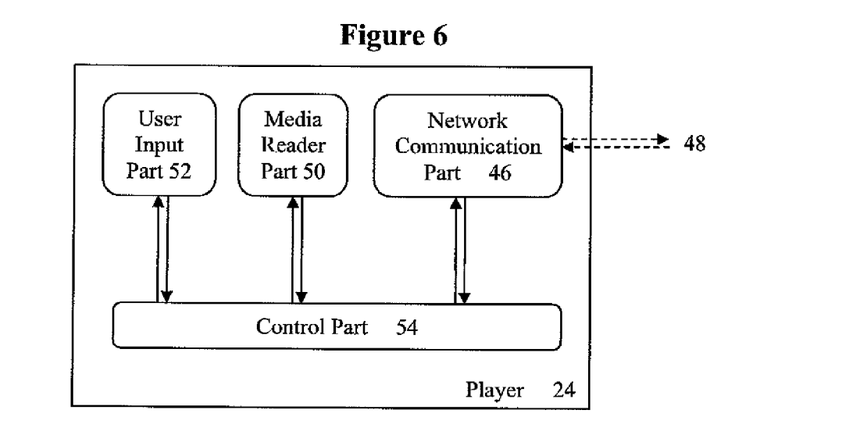
FIG. 6 notionally illustrates an example of a media player according to an exemplary embodiment of the present disclosure.

An exemplary media player 24, shown generally in FIG. 6, includes a network communication part 46 for sharing information with the unique identifier manager 20 through a network 48, a media reader part 50 for reading information and/or content from content recording media, a user input part 52 for accepting input from a user and a control part 54 configured to implement the various methodologies described herein. The control part 54 interfaces with, for example, the network communication part 46, the user input part 52 and the media reader part 50. As discussed in more detail below, the media player 24 may also include, or may be provided in communication with, a media recorder part 56 for recording content to content recording media.

Figure 7:
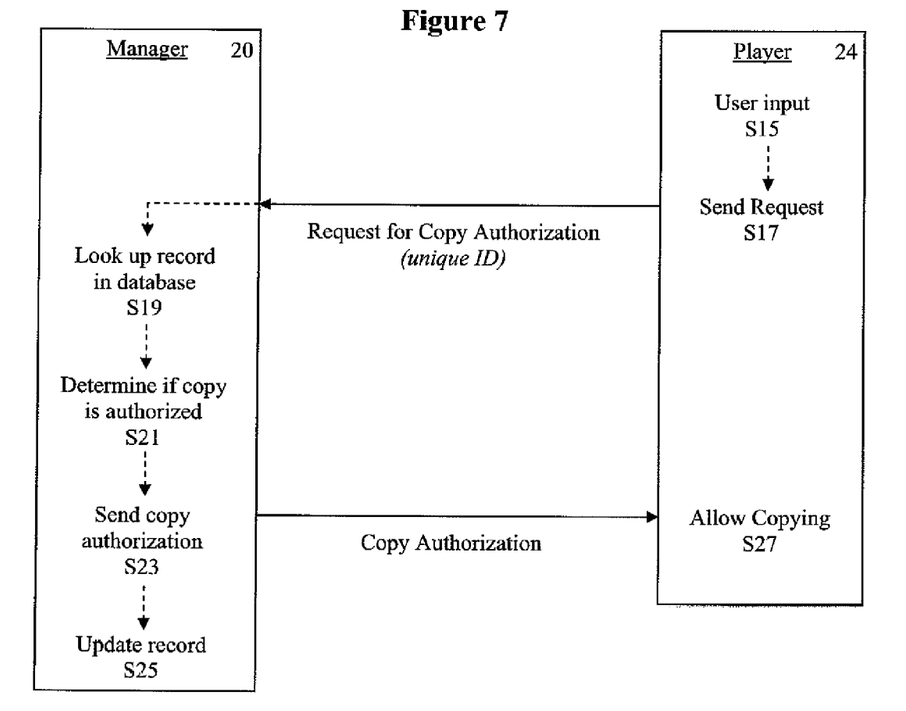
FIG. 7 graphically illustrates an example of a management approach between a manager and a player according to an exemplary embodiment of the present disclosure.

In an embodiment of a content copy authorization scheme, illustrated generally in FIG. 7, a predetermined number of authorized copies is allocated per medium. In other words, depending on a configuration of the medium or manager 20, a user may be allowed to copy the contents of a content recording medium to a predetermined number of back-up media or locations.

In one example, such as the one shown in FIG. 6, a media player 24 includes a network communication part 46 which is configured to share information through a network 48 with the manager 20. The manager 20, as discussed above, may be the same manager 20 as is configured to manage the distribution of unique identifiers to content recording media replicators 22. Likewise, the database 32 used in managing the distribution of unique identifiers to replicators 22 may also be used to respond to content copy authorization requests. Such combination of uses has synergistic benefits, described below, which are not realized by separately provided unique identifier distribution systems and content copy authorization systems.

In response to an input received S15 from a user through a user input part 52, a player 24 in communication with a medium to which is recorded a unique identifier which was originally returned to a content recording media replicator 22 by a manager 22 is configured to contact that manager 22 to request authorization S17 to allow the user to copy the content stored on the medium to another medium or location. Information for contacting the manager 20 may also be recorded to the medium and used by the player to locate and/or communicate with the manager 20. The copy authorization request includes the unique identifier recorded to the medium in communication with the player 24. The copy authorization request also may include an identification of the player 24 sending the request, an identification of the content for which the request is being sent, an identification of the user, and identification of the replicator 22 which produced the medium, etc. The unique identifier, together with any such optional information, is used by the manager 20 to determine whether or not to grant the copy authorization request.

As mentioned above, the record 34 in the database 32 of the manager 20 for each content identifier returned to a replicator 22 may include an indication of how many times content recorded to a particular medium may be copied. The number of authorized copies may, for example, be set by a replicator 22 or owner of the content. In the case that no copies are allowed, for example, the number of authorized copies would be stored in the record 34 as zero. Similarly, as another example, in the case that copying of the content is not restricted, the number of authorized copies would be stored in the record 34 as infinite. The number of authorized copies may be predetermined based on the content for which the unique identifiers are returned or may be different from unique identifier request to unique identifier request or from medium to medium. For example, a content may be recorded to media having two or more different numbers of authorized copies. In this example, one medium to which a particular content is recorded may be recorded with a unique identifier for which the record 34 in the database 32 of the manager 20 indicates zero authorized copies. A different medium, such as a deluxe edition, to which the same content was recorded may be recorded with a unique identifier for which the record 34 in the database 32 of the manager 20 may indicate one or more copies are authorized.

As another example, the number of authorized copies recorded in the database 34 may vary depending on a type of media to which the content and unique identifiers are recorded. In this example, when the request from the replicator for unique identifiers is processed by the manager 20, an indication in the request of the type of media to which the unique identifiers will be recorded may be used to determine the number of authorized copies.

Upon receiving a copy authorization request from a player 24 in communication with a medium having a unique identifier, the manager 20 looks up S19 the corresponding record 34 in the database 32 and determines S21 whether a copy is authorized. If a copy is authorized, that is, a number of previously authorized copies is less than the number of authorized copies, the manager 20 sends S23 a copy authorization to the player 24 and updates S25 the corresponding record by increasing by one the number of copies previously authorized in the record 34 for the unique identifier. If the copy authorization request is denied, for example, in the case that the number of authorized copies is zero or is equal to the number of previously authorized copies, the manager 20 sends a copy denial to the player 24. Upon receipt of a copy authorization, the player allows S27 copying of the content.

In another aspect of the present disclosure, a media player 24 may also include, or may be provided in communication with, a media recording part 56. Examples of such media players 24 are shown generally in FIGS. 8A and 8B.

Figure 8A:
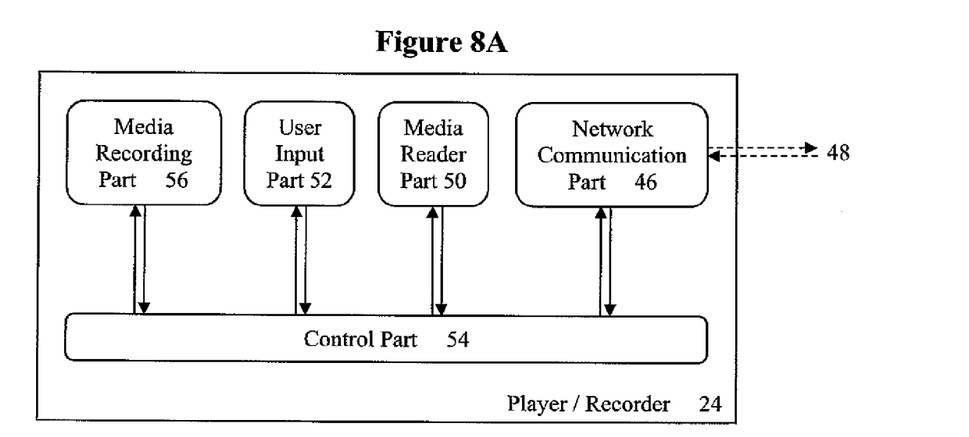
FIG. 8A notionally illustrates an example of a combined media player and recorder according to an exemplary embodiment of the present disclosure.

In the combined media player and recorder 24 shown in FIG. 8A, the combined media player 24 includes both a media reader part 50 and a media recording part 56. An example of such a combination player and recorder 24 is a DVD-RW drive or BD-R drive configured to play and record to recordable media.

Figure 8B:
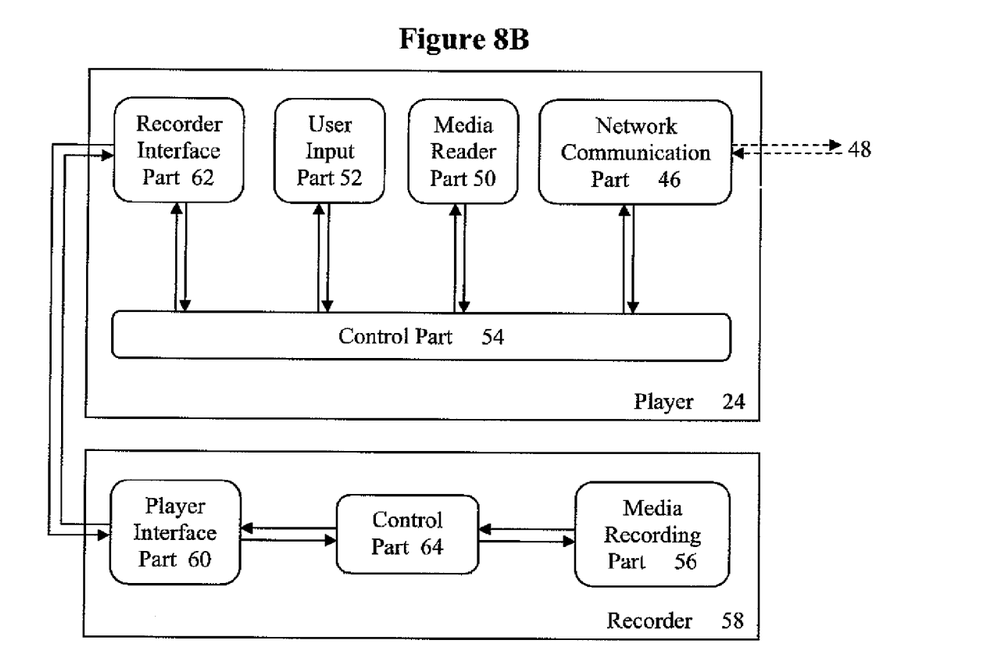
FIG. 8B notionally illustrates an example of a media player in communication with a media recorder according to an exemplary embodiment of the present disclosure.

FIG. 8B shows generally a media player 24 in communication with a media recorder 58. The media recorder 58 includes a player interface part 60 for sharing information with the media player 24 through a recorder interface part 62 of the media player 24, a media recording part 56, and a control part 64 for implementing the various methodologies described herein. The control part 64 interfaces with, for example, the media recording part 56 and the player interface part 60.

Figure 9:
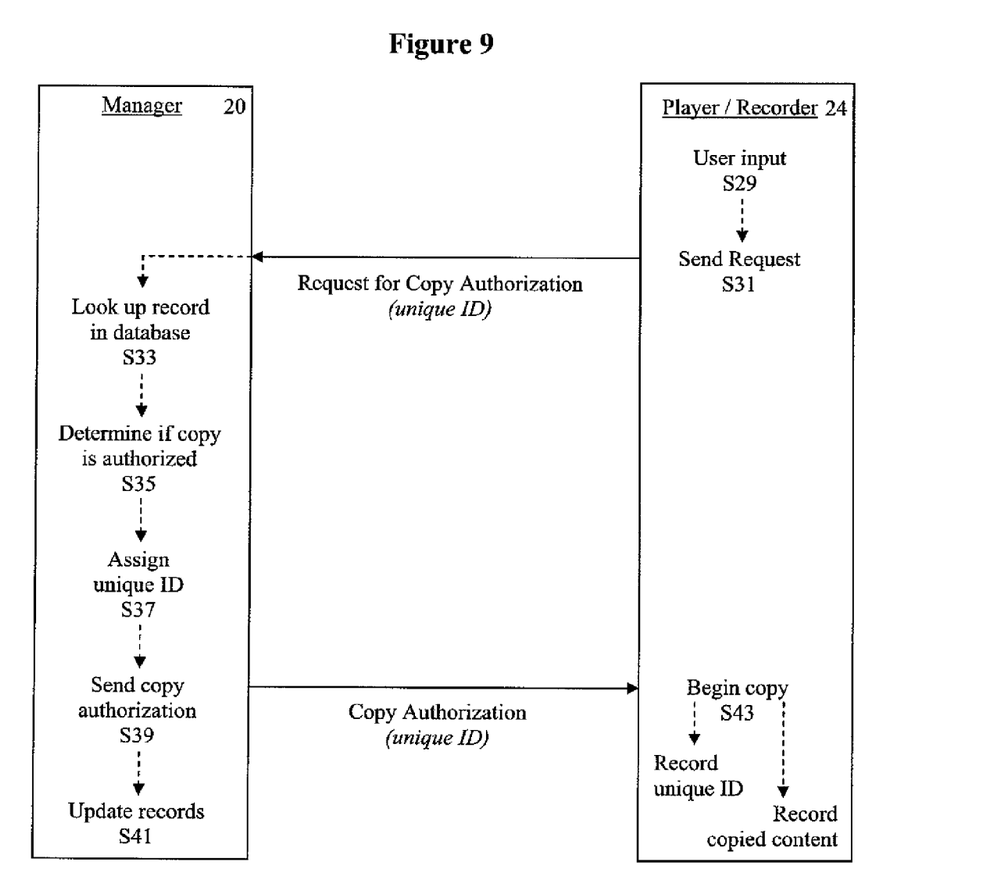
FIG. 9 graphically illustrates an example of a management approach between a manager and a player having or in communication with a media recorder according to an exemplary embodiment of the present disclosure.

In an exemplary method for controlling the copying of content recorded to content recording media along with unique identifiers, shown generally in FIG. 9, a unique identifier manager 20 is configured to interact with a media player 24 having, or being provided in communication with, a media recording part 56.

In addition to authorizing or denying a copy request from a player 24, as discussed above, the manager 20 may also be configured to distribute unique identifiers to players 24 along with a copy authorization. In this example, the player 24 may be configured to only allow a copy operation to proceed if a unique identifier received along with the copy authorization is recorded along with the copy of the content or may be configured to allow a copy operation to proceed after receipt of a copy authorization and require that a unique identifier, if any, received with the request be recorded along with the copied content. A unique identifier sent with the copy authorization, like the unique identifiers sent to replicators, has a record 34 in the database 32 managed by the manager 20. Thus, the manager 20 may control the number of copies authorized for the medium to which the copy was recorded. In other words, the manager 20 may control the number of times a copy may be made of a copy.

Like the procedure used to authorize, assign and return unique identifiers to a replicator 22, information regarding the player 22, the original medium, etc. may be stored in the record 34 of the original unique identifier as well as the unique identifier sent with the copy authorization request. In this way, a detailed family tree may be stored by the manager 20 with respect to the original and copies of the content.

In the exemplary method generally shown in FIG. 9, the player 24 receives input from a user S29 and, in response, sends a request S31 to the manager 20 for copy authorization. The request includes a unique identification recorded to the medium in communication with the player 24. The request may also include any of the information described above and also may include an indication that the player 24 is equipped with or is in communication with a media recording part 56. Upon receipt of the copy authorization request, the manager 20 looks up S33 the record 34 corresponding to the unique identifier indicated in the request in the database 32. As described above, the manager determines S35, based on the record 34, whether to grant or deny the copy authorization request. If the request is granted, the manager assigns a new unique identifier S37 for the copy, sends S39 the copy authorization along with the unique identifier for the copy to the player 24 and updates S41 the record 34 for both the original unique identifier received in the copy authorization request as well as the record 34 for the new unique identifier sent along with the copy authorization. The player, upon receipt of the copy authorization and unique identifier, begins copying S43 the content from the original medium along with the new unique identifier to a copy medium.

In another aspect, the unique identifier management methods discussed herein may be applied to optical storage media replication processes. In such processes, a content provider may send a file containing the content along with a job request indicating at least a number of desired finished discs to a replicator 22. The file containing the content may take many forms. For example, the content may be represented by a disc image, a compressed or encrypted file, etc. In another example related to Blu-Ray discs, a BDCMF (Blu-ray Disc Cutting Master Format) file containing the content is sent by the content provider to the replicator 22. The file containing the content may include an identification of the content, an identification of the content producer, a combined identification etc.

The replicator 22 accepts the content file and job request from the content provider and prepares a unique identifier request to send to the unique identifier manager 20, as described above. The unique identifier request may be created with information in the job request received from the content producer, such as, for example, the content identification, content producer identification, number of finished media required, etc.

The replicator 22 uses the file containing the content to create a stamper for molding an information surface comprising corresponding pits and lands in an information layer of optical storage media in a content recording part 40.

The unique identifiers returned by the manger 20 may take the form of PMSNs (Pre-recorded Material Serialized Number). The list of PMSNs returned by the manager 20 to the replicator 22 may then be input into a BCA (Burst Cutting Area) writer performing the duties of a unique identifier recording part 42 of the replicator 22.

The unique identifier manager may be comprised in an MCS (Managed Copy Server). The MCS may also respond to replication requests from players using the methods described herein or any other method known in the art.

In another aspect, the manager may be configured to accept payment in exchange for copy authorization. Such payment may be collected and processed according to any method known in the art.

In addition, the embodiments and examples above are illustrative, and many variations can be introduced on them without departing from the spirit of the disclosure or from the scope of the appended claims. For example, elements and/or features of different illustrative and exemplary embodiments herein may be combined with each other and/or substituted for each other within the scope of this disclosure.

This disclosure is based on U.S. Provisional Application No. 61/362,215, entitled "MEDIA REPLICATION METHOD AND COPY PROTECTION METHOD AND APPARATUSES THEREFOR" and filed Jul. 7, 2010, the entire contents of which are incorporated herein by reference.

What is claimed is:

1. A method for managing the replication of content recording media, said method including the steps of:
   (a) receiving, from a requestor, a request for one or more unique identifiers, said request indicating at least a requested number of unique identifiers, identification of the requestor and identification of a content for which the unique identifiers are requested;

(b) assigning to the requestor at least the requested number of unique identifiers and returning the assigned unique identifiers to the requestor;
(c) storing a record in a database for each of the unique identifiers returned in (b), each record indicating for the corresponding unique identifier returned in (b) a first status indicating that the unique identifier has been returned;
(d) receiving a notice from the requestor including a second status indicating, for each unique identifier that is recorded to an acceptable medium after having been returned in (b), that the unique identifier has been used;
(e) updating the record in the database for each of the unique identifiers included in the notice received in (d) from the requestor to indicate the second status; and
(f) causing, for future requests, unique identifiers having a record indicating the first status or second status to not be returned to a future requestor.

2. The method of claim 1, wherein each record stored in (c) includes an indication of at least one of the identification of the requestor and the identification of the content received in (a).

3. The method of claim 1, wherein the notice received in (d) also includes a third status for any unique identifiers returned to the requestor in (b) but which were not recorded to an acceptable medium.

4. The method of claim 1, wherein the database is configured with a default third status in records for each unique identifier and the only unique identifiers returned in (b) are those for which the corresponding record in the database indicates the third status.

5. The method of claim 1, wherein the notice received in (d) also includes one of a third status indicating that the unique identifier was not used and a fourth status indicating that the unique identifier was recorded to an unacceptable medium for any unique identifier not recorded to an acceptable medium.

6. The method of claim 1, wherein the unique identifiers assigned and returned to the requestor in (b) are selected from the database in response to the request from the requestor received in (a).

7. The method of claim 1, further including the steps of:
(g) generating, in response to receiving the request in (a), at least the number of requested unique identifiers; and
(h) creating a record in the database for each of the unique identifiers generated in (g).

8. The method of claim 7, wherein at least one of the identification of the requestor, the identification of the content and a time of the request received in (a) are used in (g) to generate the unique identifiers.

9. The method of claim 7, wherein the unique identifiers generated in (g) are configured to indicate at least one of the identification of the requestor, the identification of the content and a time of the request received in (a).

10. The method of claim 1, wherein at least the identification of the content and an indication of the creator of the content are indicated in the request received in (a) by a combined content identifier.

11. The method of claim 1, wherein the unique identifiers returned in (b) are configured to be unique for every acceptable medium manufactured.

12. The method of claim 1, wherein the unique identifiers returned in (b) are configured to be unique for every acceptable medium to which the content identified in the request received in (a) is recorded.

13. The method of claim 1, wherein the unique identifiers are pre-recorded material serialized numbers, the method is performed by a managed copy server, and the request received in (a) includes information received by the replicator in a job request or content file received by the replicator from a content producer.

14. The method of claim 13, wherein the content recording media are Blu-ray discs and the content file is a Blu-ray Disc Cutting Master Format file.

15. A method for controlling the distribution of content including the method of claim 1 and further including the steps of:
(i) storing a predetermined allowable copies number for at least each unique identifier recorded to an acceptable medium in the corresponding record in the database;
(j) receiving a content copy authorization request from a media player in communication with a medium, the request including at least a unique identifier recorded to the medium;
(k) determining the status of the unique identifier from a record in the database corresponding to the unique identifier received in (j);
(l) granting the content copy authorization request if the record for the unique identifier received in (j) indicates the second status and a number of granted copy authorization requests indicated in the record is less than the predetermined allowable number of copies stored in (i); and
(m) increasing the number of granted copy authorization requests in the record by one if the content copy authorization request is granted in (l).

16. The method of claim 15, wherein the content copy authorization request from the media player received in (i) also includes an identification of the player sending the request and the identification of the player is stored in the record for the unique identifier received in (i) in the database if the content copy request is granted in (l).

17. The method of claim 15, further comprising:
(n) assigning a unique identifier to the content copy authorization request, storing a corresponding record in the database and returning the assigned unique identifier along with a copy authorization granted in (l) to the media player.

18. A unique identifier managing apparatus configured to manage the replication of content recording media, said apparatus comprising:
a network communication part configured to share information through a network with one or more clients;
a data storage part configured to store a database including records for one or more unique identifiers;
a control part configured to:
(a) process a request received from a requestor through the network communication part, said request indicating at least a requested number of unique identifiers, identification of the requestor and identification of a content for which the unique identifiers are requested;
(b) assign to the requestor at least the requested number of unique identifiers and return the assigned unique identifiers to the requestor through the network communication part;
(c) store a record in the database for each of the unique identifiers returned in (b), each record indicating for the unique identifiers returned in (b) a first status indicating that the unique identifier has been returned;
(d) receive a notice from the requestor through the network communication part including a second status indicating, for each unique identifier that is recorded to an acceptable medium after having been returned in (b), that the unique identifier has been used;

(e) update the record in the database for each of the unique identifiers included in the notice received in (d) from the requestor to indicate the second status; and
(f) cause, for future requests, unique identifiers having a record indicating the second status to not be returned to a future requestor.

* * * * *